United States Patent
Nakazawa et al.

(10) Patent No.: US 10,926,647 B2
(45) Date of Patent: Feb. 23, 2021

(54) VEHICLE DRIVING APPARATUS

(71) Applicant: KABUSHIKI KAISHA TOYOTA CHUO KENKYUSHO, Nagakute (JP)

(72) Inventors: Teruhiko Nakazawa, Nagakute (JP); Ryoichi Hibino, Nagakute (JP); Makoto Kusakabe, Nagakute (JP); Yasumitsu Osada, Nagakute (JP); Shoji Nakahara, Nagakute (JP); Hiroyuki Nishizawa, Nagakute (JP); Yasuhiro Torii, Okazaki (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/388,970

(22) Filed: Apr. 19, 2019

(65) Prior Publication Data
US 2019/0329658 A1 Oct. 31, 2019

(30) Foreign Application Priority Data
Apr. 26, 2018 (JP) .............................. JP2018-084737

(51) Int. Cl.
*B60W 20/17* (2016.01)
*F16H 57/00* (2012.01)
(Continued)

(52) U.S. Cl.
CPC .............. *B60L 15/38* (2013.01); *F16H 3/727* (2013.01); *F16H 57/0006* (2013.01); *B60L 2270/14* (2013.01)

(58) Field of Classification Search
CPC ..... B60L 2270/14; B60W 20/17; H02P 25/22; H02K 1/246; F16H 57/0006
See application file for complete search history.

(56) References Cited

U.S. PATENT DOCUMENTS

2005/0124451 A1* 6/2005 Morikawa ............... B60L 1/003 475/6
2012/0239237 A1* 9/2012 Hashimoto ........... B60W 10/06 701/22
(Continued)

FOREIGN PATENT DOCUMENTS

JP 2007-068301 A 3/2007
JP 2013-223352 A 10/2013
(Continued)

OTHER PUBLICATIONS

Atsushi Ogata. "Science of Rhythms and Modes." Kondansha, Sep. 2007, pp. 83-114.
(Continued)

*Primary Examiner* — Tisha D Lewis
(74) *Attorney, Agent, or Firm* — Oliff PLC

(57) ABSTRACT

A vehicle driving apparatus includes a first motor, a second motor, and a planetary mechanism, and obtains a driving force by combining motive forces obtained from the first motor and the second motor by a planetary gear of the planetary mechanism. The vehicle driving apparatus includes at least one of a design value and a control quantity in which a frequency ratio between a sound generated by a rotation of the first motor and a sound generated by a rotation of the second motor satisfies a reduction condition of dissonance.

9 Claims, 12 Drawing Sheets

(51) Int. Cl.
B60L 15/38 (2006.01)
F16H 3/72 (2006.01)

(56) References Cited

U.S. PATENT DOCUMENTS

| | | | |
|---|---|---|---|
| 2014/0243136 A1 | 8/2014 | Hikida et al. | |
| 2015/0057862 A1* | 2/2015 | Sato | B60W 10/196 |
| | | | 701/22 |
| 2015/0321573 A1* | 11/2015 | Sato | B60L 11/1851 |
| | | | 701/22 |
| 2016/0036366 A1* | 2/2016 | Yang | H02K 19/103 |
| | | | 318/701 |

FOREIGN PATENT DOCUMENTS

| | | |
|---|---|---|
| JP | 2014-159832 A | 9/2014 |
| WO | 2013/046748 A1 | 4/2013 |

OTHER PUBLICATIONS

Nov. 17, 2020 Office Action issued in Japanese Patent Application No. 2018-084737.

* cited by examiner

VEHICLE DRIVING APPARATUS

CROSS REFERENCE TO RELATED APPLICATION

This application claims priority to Japanese Patent Application No. 2018-084737 filed on Apr. 26, 2018, which is incorporated herein by reference in its entirety including the specification, claims, drawings, and abstract.

TECHNICAL FIELD

The present disclosure relates to a vehicle driving apparatus, and in particular to a vehicle driving apparatus in which motive forces of two motors are combined by a planetary mechanism.

BACKGROUND

Apparatuses are known in which motive forces of two motors are combined by a planetary mechanism, to obtain a driving force. For example, JP 2007-68301 A discloses an electronically-driven vehicle in which torques obtained from two motors are transmitted to one vehicle drive shaft via a planetary gear mechanism, and a control apparatus for the electrically-driven vehicle.

It is also known that a beat occurs due to a rotation of the motor or the like. For example, JP 2014-159832 A discloses a beat control apparatus in which frequency of an engagement sound generated by engagement of a drive pulley driven by a drive motor and a toothed belt is obtained, and, when a difference between the frequency of the engagement sound and a frequency of a vibration sound of the toothed belt is within a predetermined range, occurrence of a beat is predicted, and a number of rotations of the drive motor is changed. In addition, for example, Atsushi OGATA, "Science of Rhythms and Modes", Kodansha, September, 2007. pp. 83-114 discloses a degree of dissonance which is an index for evaluating degree of hearing of the beat sound or the like.

When motive forces of two motors are combined by the planetary mechanism to obtain a driving force, there may be cases where noise such as the beat sound occurs due to a rotational motion difference between the two motors. For example, in JP 2014-159832 A, it is predicted that the beat will occur when the difference between the frequency of the engagement sound and the frequency of the vibration sound of the toothed belt is within a predetermined range, and a control is executed. However, the predetermined range is limited to a very narrow range such as, for example, lower than or equal to 20 Hz. Because of this, even when the control of JP 2014-159832 A is applied to an apparatus which uses the planetary mechanism, it is not possible to reduce the noise due to the rotational motion difference between the two motors to a practically satisfactory level.

An advantage of die present disclosure lies in reduction of a noise generated by rotations of two motors (for example, degree of dissonance of two sounds prominent for the sonic perception) in a vehicle driving apparatus which obtains a driving force by combining motive forces of two motors by a planetary mechanism.

SUMMARY

According to one aspect of the present disclosure, there is provided a vehicle driving apparatus which obtains a driving force by combining a motive force of a first motor and a motive force of a second motor by a planetary mechanism, the vehicle driving apparatus comprising: at least one of a design value and a control quantity in which a frequency ratio between a sound generated by a rotation of the first motor and a sound generated by a rotation of the second motor satisfies a reduction condition of dissonance.

According to another aspect of the present disclosure, for example, a design item included in at least one of the first motor, the second motor, and the planetary mechanism may be set to a design value which satisfies the reduction condition of the dissonance.

According to another aspect of the present disclosure, for example, at least one gear included in the planetary mechanism may have a number of teeth which satisfies the reduction condition of the dissonance.

According to another aspect of the present disclosure, for example, at least one of the first motor and the second motor may be controlled to a number of rotations which satisfies the reduction condition of the dissonance.

According to another aspect of the present disclosure, for example, at least one of the first motor and the second motor may be controlled such that a difference in the number of rotations between the first motor and the second motor satisfies the reduction condition of the dissonance.

According to another aspect of the present disclosure, as the reduction condition of the dissonance, there may be set a condition in which a frequency ratio $f_{M1}/f_{M2}$ between a frequency $f_{M1}$ of the sound generated by the rotation of the first motor and a frequency $f_{M2}$ of the sound generated by the rotation of the second motor satisfies one of: (condition 1) $f_{M1}/f_{M2}<0.87$; (condition 2) $0.9943<f_{M1}/f_{M2}<1.0057$; and (condition 3) $1.14<f_{M1}/f_{M2}$.

According to the present disclosure, in a vehicle driving apparatus mat obtains a driving force by combining motive forces of two motors by a planetary mechanism, a noise generated by the rotations of the two motors (for example, a degree of dissonance of two sounds prominent for the sonic perception) is reduced.

BRIEF DESCRIPTION OF DRAWINGS

Embodiment(s) of the present disclosure will be described by reference to the following figures, wherein.

DESCRIPTION OF EMBODIMENTS

Figure 1:
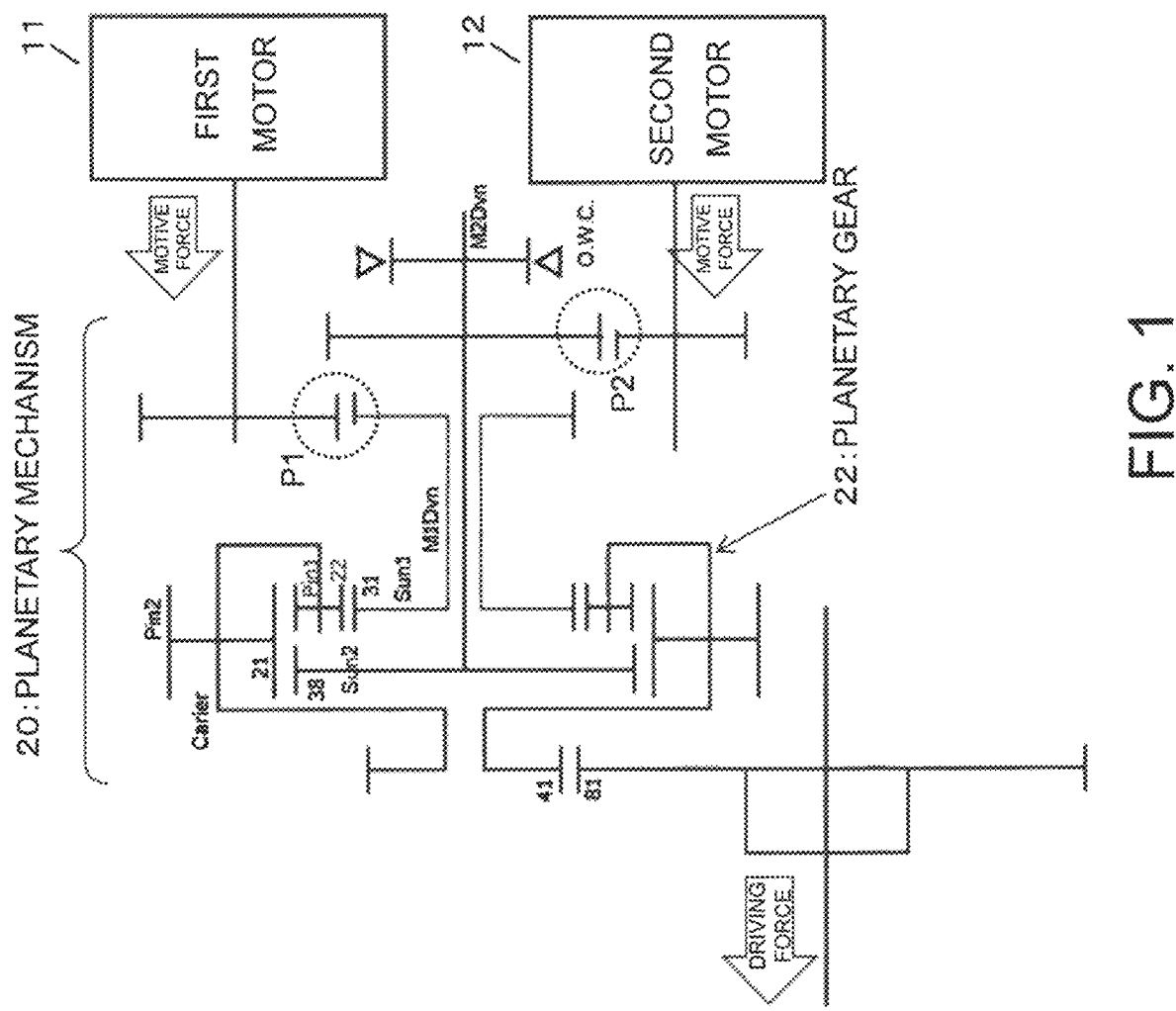
FIG. 1 is a diagram showing a specific example configuration of a vehicle driving apparatus.

FIG. 1 is a diagram showing an embodiment of the present disclosure, and shows a specific example of a vehicle driving apparatus. The vehicle diving apparatus exemplified in FIG. 1 comprises a first motor 11, a second motor 12, and a planetary mechanism 20. The vehicle driving apparatus exemplified in FIG. 1 obtains a driving force by combining motive forces obtained from the two motors (electric motors) including the first motor 11 and the second motor 12 by a planetary gear 22 of the planetary mechanism 20.

Figure 2:
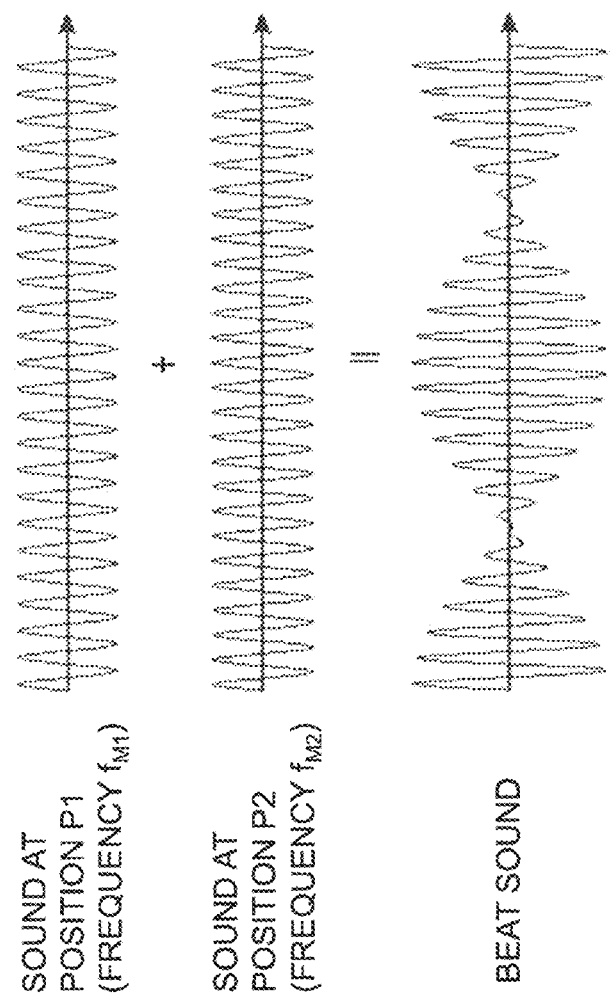
FIG. 2 is a diagram for explaining a beat which is generated by rotations of two motors.

FIG. 2 is a diagram for explaining a beat which is generated by the rotations of the two motors. FIG. 2 shows a specific example waveform of a sound generated at a position P1 of FIG. 1 and a specific example waveform of a sound generated at a position P2 of FIG. 1.

The position P1 of FIG. 1 corresponds to an engagement portion in a gear reducer immediately before the motive force obtained from the first motor 11 enters (is transmitted to) the planetary gear 22, and the position P2 of FIG. 1 corresponds to an engagement portion in a gear reducer immediately before the motive force obtained from the second motor 12 enters (is transmitted to) the planetary gear 22.

For example, when a frequency $f_{M1}$ of the sound at the position P1 and a frequency $f_{M2}$ of the sound at the position P2 are relatively close to each other, a beat sound as exemplified in FIG. 2 occurs.

Figure 3A:
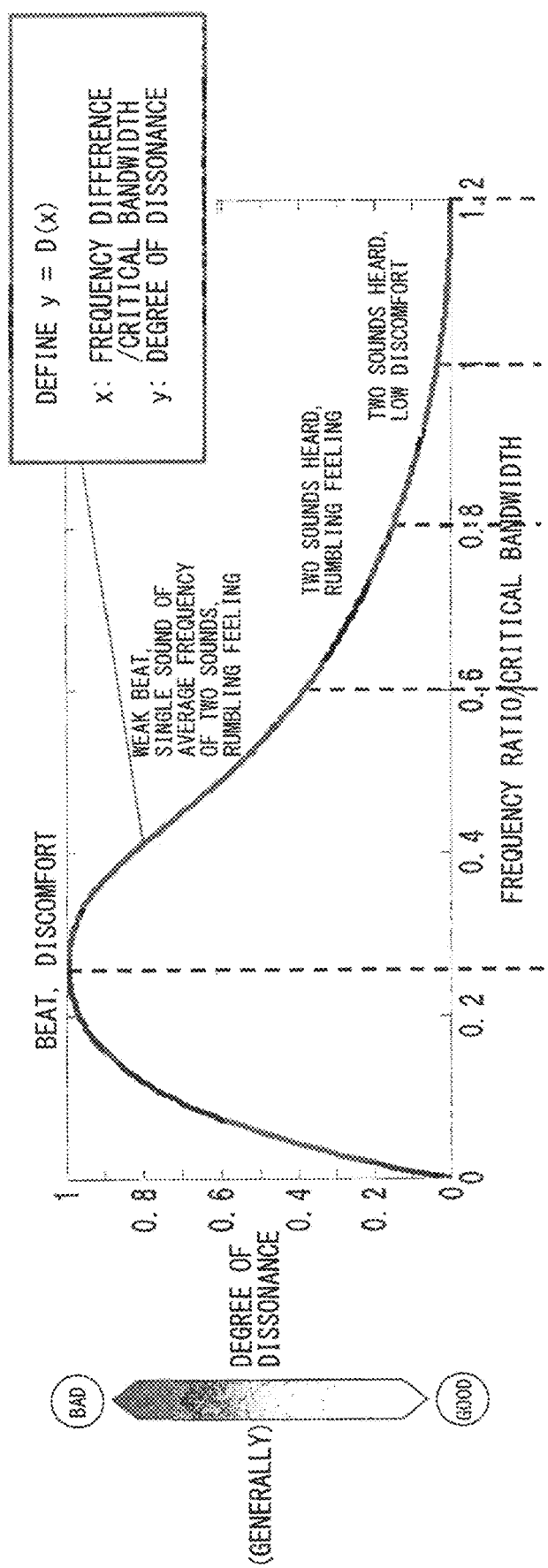
FIG. 3A is a diagram for explaining dissonance of two sounds.
Figure 3B:
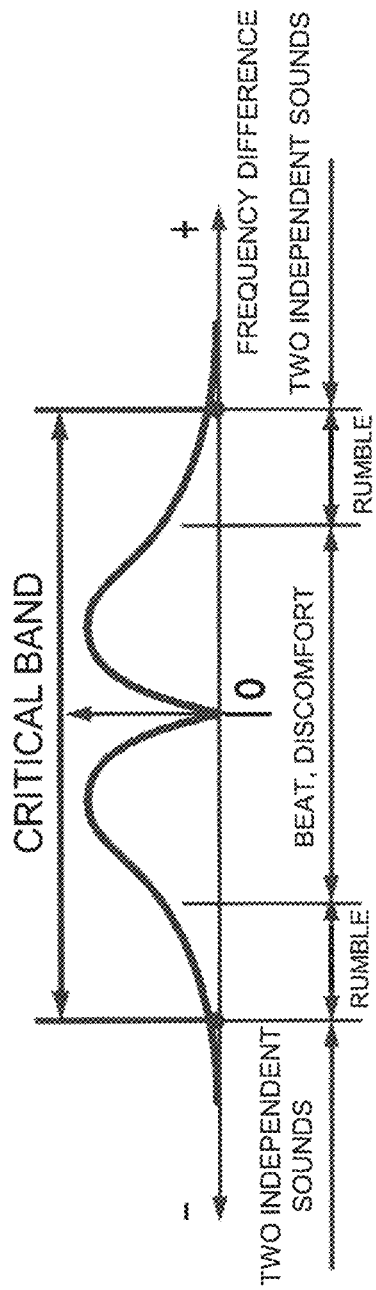
FIG. 3B is a diagram for explaining dissonance of two sounds.

FIGS. 3A and 3B are diagrams for explaining dissonance of two sounds. FIGS. 3A and 3B show a specific example of the perception of hearing for a sound obtained by fixing a frequency of one of two pure tones while changing a frequency of the other, and overlapping the two pure tones.

FIG. 3A shows a specific example of a degree of dissonance (dissonance degree). A degree of dissonance shown on a vertical axis of FIG. 3A is obtained by determining a degree of hearing (good/bad) obtained by hearing the two pure tones in an overlapped manner, by a majority vote of a plurality of people. As the degree of dissonance is increased, the beat sound and discomfort are increased, and the degree of hearing is worsened, in the specific example configuration of FIG. 3A, the degree of dissonance of 1 is the maximum (worst), and the degree of dissonance of 0 is the minimum (best).

A horizontal axis of FIG. 3A corresponds to a difference in frequency of the two pure tones. A value on the horizontal axis of FIG. 3A is a value obtained by dividing the frequency difference by a critical bandwidth shown in FIG. 3B. For example, when two sounds of close frequencies are heard, a region of the frequency difference where there is the beat, discomfort, rumbling feeling, or the like is called a critical band.

Figure 4A:
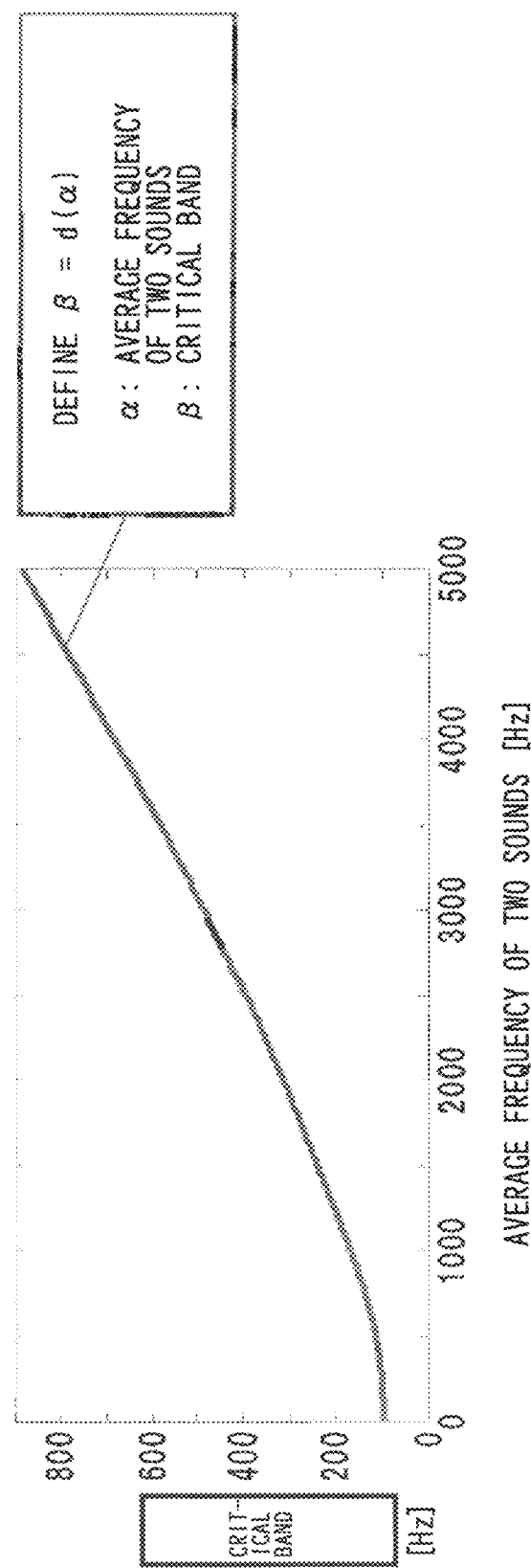
FIG. 4A is a diagram for explaining a critical band.
Figure 4B:
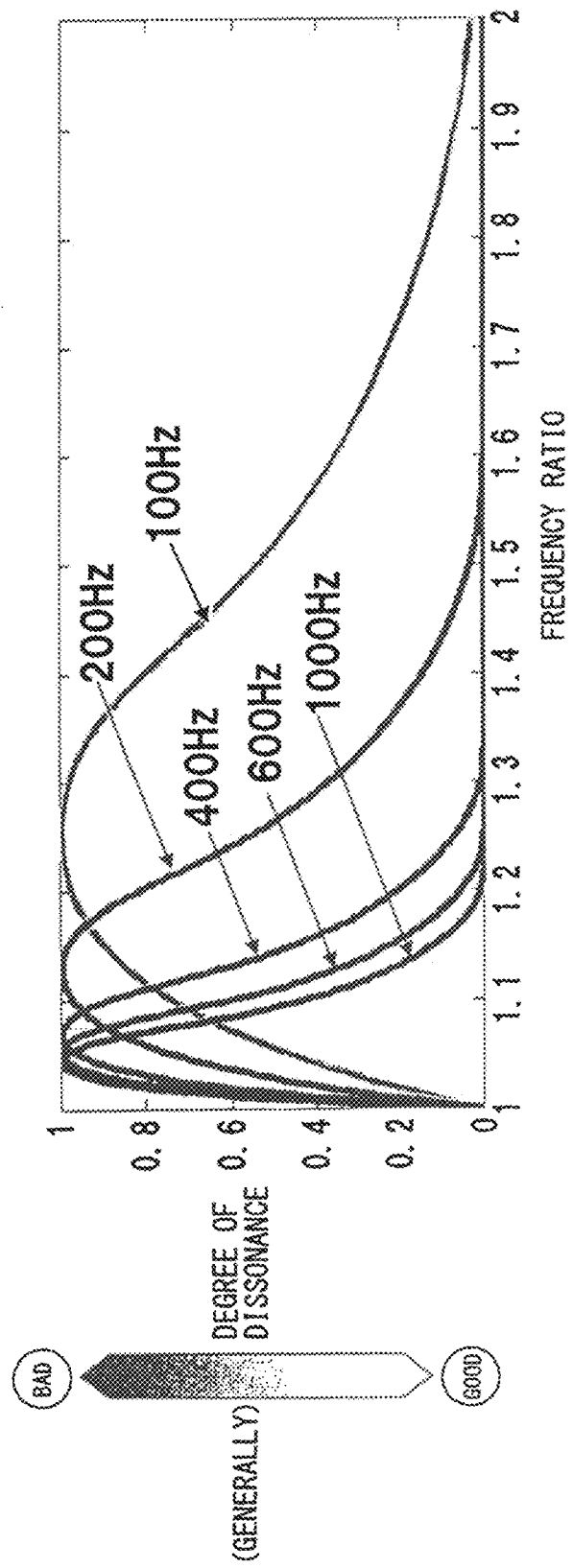
FIG. 4B is a diagram for explaining a critical band.

FIGS. 4A and 4B are diagrams for explaining the critical band. FIG. 4A shows a relationship between an average frequency of two sounds and the critical band. As shown in FIG. 4A, there is a tendency that, as the average frequency of two sounds (horizontal axis) becomes larger, the critical band (horizontal axis) becomes larger.

FIG. 4B shows a relationship between a frequency ratio of two sounds and the degree of dissonance. FIG. 4B shows a degree of dissonance obtained by changing the frequency ratio by fixing a frequency of one of the two sounds while changing the frequency of the other. The frequencies (100 Hz, 200 Hz, 400 Hz, 600 Hz, and 1000 Hz) shown in FIG. 4B correspond to the fixed frequencies. If the horizontal axis of FIG. 4B is changed from the frequency ratio to the frequency difference/critical bandwidth, the relationship can be arranged to the waveform of FIG. 3A.

As exemplified in FIG. 2, for the sounds generated by the rotations of the first motor 11 and the second motor 12 of FIG. 1 also, the beat sound may be generated depending on the relationship between the frequency $f_{M1}$ and the frequency $f_{M2}$. An equation deriving the degree of dissonance as explained with reference to FIGS. 3 and 4, from the two frequencies $f_{M1}$ and $f_{M2}$, is defined as follows.

$$\text{The degree of dissonance} = D\left(\frac{f_{M1} - f_{M2}}{d\left(\frac{f_{M1} + f_{M2}}{2}\right)}\right) \quad \text{[Formula 1]}$$

$$\text{Critical band} = d\left(\frac{f_{M1} + f_{M2}}{2}\right)$$

Figure 5:
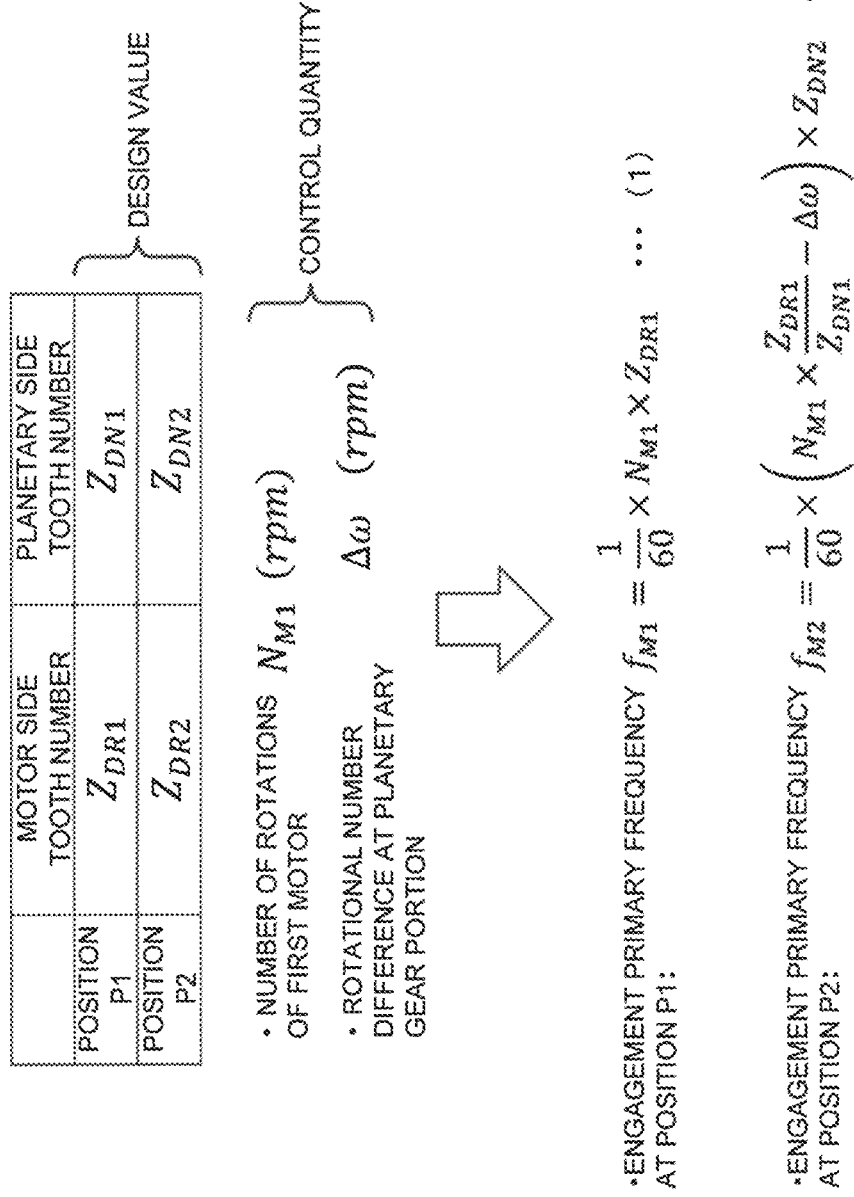
FIG. 5 is a diagram showing a specific example configurations of a design value and a control quantity related to two frequencies.

FIG. 5 is a diagram showing specific examples of a design value and a control quantity related to two frequencies. FIG. 5 exemplifies, as specific examples of the design values of the vehicle driving apparatus shown in FIG. 1, a number of teeth $Z_{DR1}$ of a gear on the side of the first motor 11 (the drive side) at the position P1, a number of teeth $Z_{DN1}$ of a gear on the side of the planetary gear 22 (the driven side) at the position pi, a number of teeth $Z_{DR2}$ of a gear on the side of the second motor 12 (the drive side) at the position P2, and a number of teeth $Z_{DN2}$ of a gear on the side of the planetary gear 22 (the driven side) at the position P2.

In addition, FIG. 5 exemplifies, as specific examples of the control quantity of the vehicle driving apparatus shown in FIG. 1, s number of rotations $N_{M1}$ of the first motor 11, and a difference $\Delta\omega$ of the number of rotations between the first motor 11 and the second motor 12 at the planetary gear 22 (combining portion).

Further, FIG. 5 exemplifies, as specific examples of the two frequencies that cause the dissonance in the vehicle driving apparatus shown in FIG. 1, a frequency $f_{M1}$ of a fundamental wave (primary) component of the sound generated by the engagement of the gears at the position P1, and a frequency $f_{M2}$ of the fundamental wave (primary) component of the sound generated by the engagement of the gears at the position P2. In the specific example configuration of FIG. 5, the frequency $f_{M1}$ and the frequency $f_{M2}$ are respectively calculated by Equations (1) and (2) of FIG. 5.

Figure 6A:
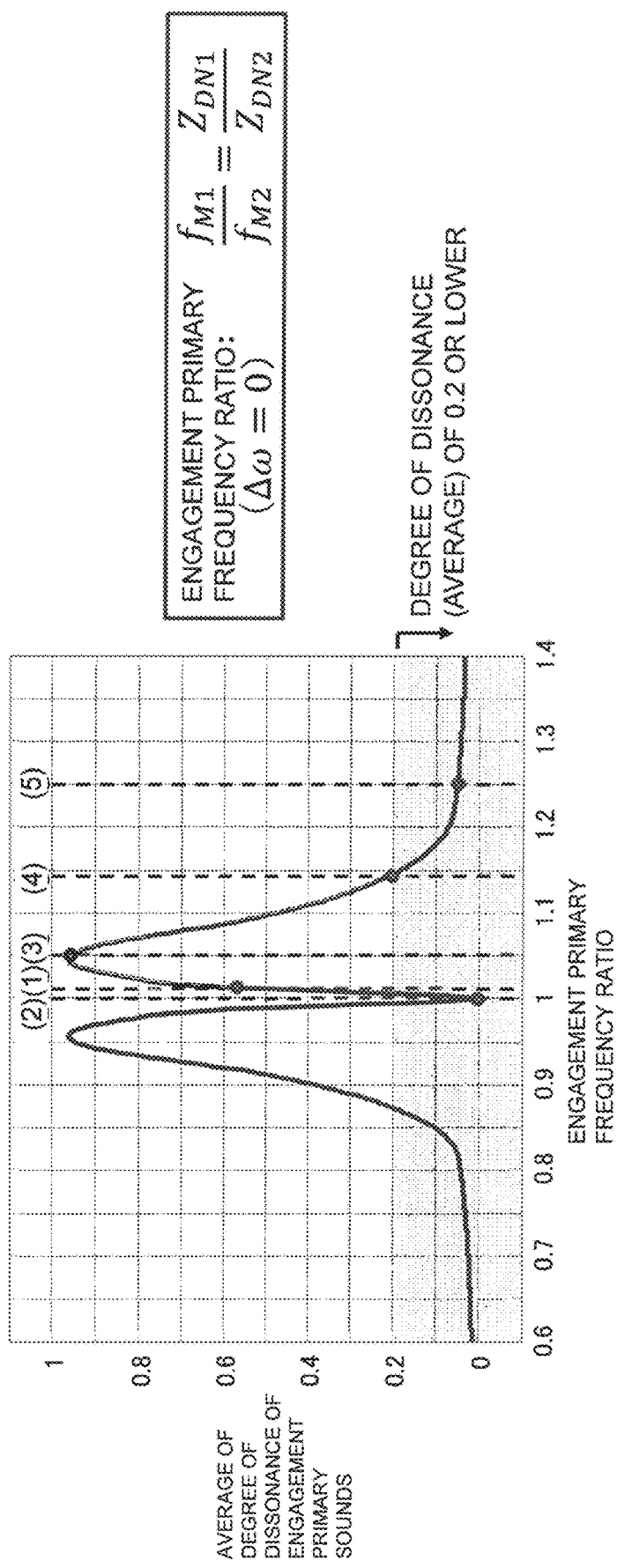
FIG. 6A is a diagram for explaining a degree of dissonance of primary engagement sounds.
Figure 6B:
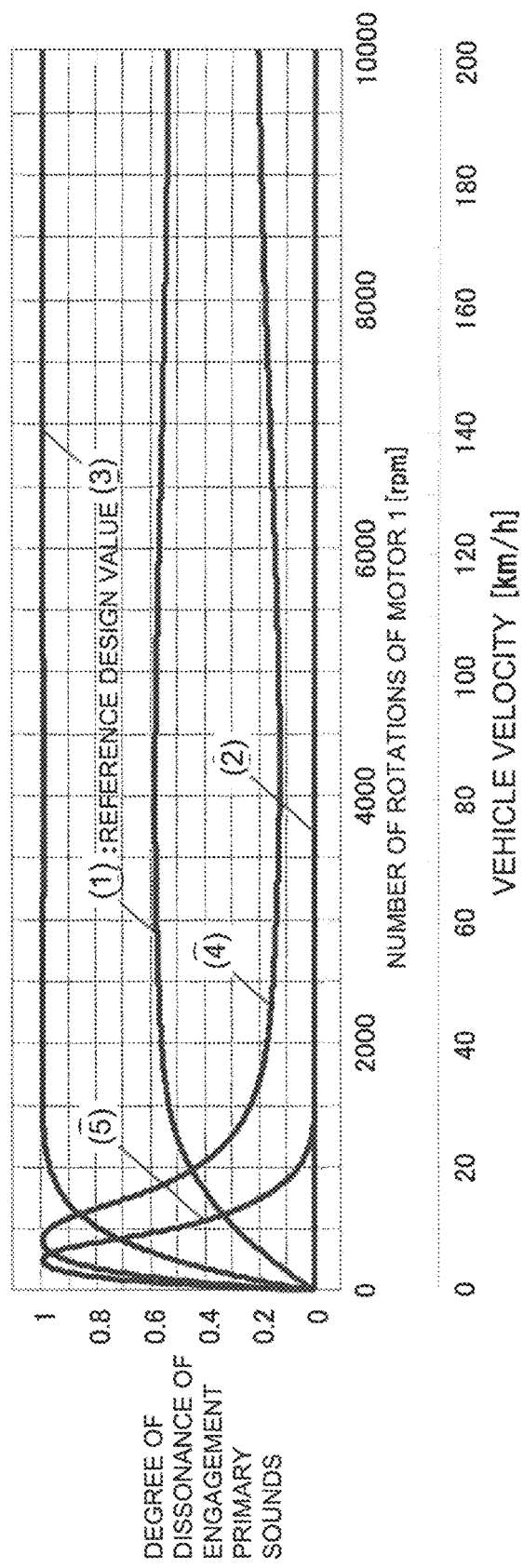
FIG. 6B is a diagram for explaining a degree of dissonance of primary engagement sounds.

FIGS. 6A and 6B are diagrams for explaining the degree of dissonance of the engagement primary sounds. FIG. 6A shows an engagement primary frequency ratio under an operation condition (high efficiency) in which the planetary gear 22 of FIG. 1 integrally rotates. In the specific example of FIG. 5, if an operation condition to set the rotational number difference $\Delta\omega$ to 0 (zero) is applied, the engagement primary frequency ratio becomes $f_{M1}/f_{M2}=Z_{DN1}/Z_{DN2}$, as shown in FIG. 6A. In other words, under the operation condition to set the rotational number difference $\Delta\omega=0$, the frequency ratio ($f_{M1}/f_{M2}$) is determined by a tooth number ratio ($Z_{DN1}/Z_{DN2}$) of the gears on the side of the planetary gear 22.

FIG. 6B shows a specific example of the degree of dissonance obtained by changing the number of rotations of the first motor 11 under the condition of the rotational number difference $\Delta\omega=0$. A horizontal axis of FIG. 6B shows the number of rotations of the first motor 11. According to the number of rotations of the first motor 11, a velocity of the vehicle (vehicle velocity) in which the vehicle driving apparatus of FIG. 1 is equipped changes. A vertical axis of FIG. 6B shows the degree of dissonance of the engagement primary sounds, which is calculated, for example, by Formula 1. FIG. 6B shows a waveform (1) obtained by a reference design value, and waveforms (2)~(5) obtained by changing the design value from the reference design value. In other words, the waveforms (2)~(5) are obtained by changing the tooth number ratio (=frequency ratio) from the waveform (1) obtained at a reference tooth number ratio (=frequency ratio).

FIG. 6A shows a correspondence relationship between the degree of dissonance and the frequency ratio. The engagement primary frequency ratio shown on the horizontal axis of FIG. 6A is the frequency ratio ($f_{M1}/f_{M2}$), and, under the condition of the rotational number difference $\Delta\omega=0$, this ratio is determined by the tooth number ratio ($Z_{DN1}/Z_{DN2}$).

An average value of the degree of dissonance of the engagement primary sounds shown on the horizontal axis of FIG. 6A is an average value of the degree of dissonance obtained for each frequency ratio ($f_{M1}f_{M2}$). For example, for each of the waveforms (1)~(5) shown on FIG. 6B, an average of the degree of dissonance is calculated over all vehicle velocity ranges, and the average value of the degree of dissonance of the frequency ratio ($f_{M1}/f_{M2}$) corresponding to waveforms (1)~(5) of FIG. 6A can be obtained.

As described above with reference to FIG. 3, as the degree of dissonance becomes higher, the beat and discomfort are increased, and the sonic perception is worsened. On the other hand, as the degree of dissonance becomes lower, the beat and the discomfort are reduced. Therefore, in the specific example configuration of FIG. 6A, for example, in order to suppress the degree of dissonance (average value thereof) to a value of 0.2 or lower, the frequency ratio ($f_{M1}/f_{M2}$) shown on the horizontal axis must satisfy one of the conditions 1~3 described below.

[Formula 2]

$$\frac{f_{M1}}{f_{M2}} < 0.87 \quad \text{(Condition 1)}$$

$$0.9943 < \frac{f_{M1}}{f_{M2}} < 1.0057 \quad \text{(Condition 2)}$$

$$1.14 < \frac{f_{M1}}{f_{M2}} \quad \text{(Condition 3)}$$

By the frequency ratio ($f_{M1}/f_{M2}$) satisfying one of the conditions 1~3 of Formula 2, it becomes possible to suppress the degree of dissonance (average value) to a low value of 0.2 or lower, and the degree of dissonance due to overlapping of the sound generated by the rotation of the first motor 11 (having the frequency of $f_{M1}$) and the sound generated by the rotation of the second motor 12 (having the frequency of $f_{M2}$) can be reduced.

For example, in the specific example configurations of FIGS. 5, 6A, and 6B, the frequency ratio ($f_{M1}/f_{M2}$) of the engagement primary sound (having the frequency of $f_{M1}$) at the position P1 and the engagement primary sound (having the frequency of $f_{M2}$) at the position P2 is determined by the tooth number ratio ($Z_{DN1}/Z_{DN2}$) of the gears on the side of the planetary gear 22 at the positions P1 and P2, under the condition of the rotational number ratio $\Delta\omega=0$. Thus, for example, the number of teeth $Z_{DN1}$ on the side of the planetary gear 22 at the position P1 and the number of teeth $Z_{DN2}$ on the side of the planetary gear 22 at the position P2 are determined such that the tooth number ratio ($Z_{DN1}/Z_{DN2}=f_{M1}/f_{M2}$) satisfies one of the conditions 1~3 of Formula 2. With this configuration, the degree of dissonance due to the engagement primary sound (having the frequency of $f_{M1}$) at the position P1 and the engagement primary sound (having the frequency of $f_{M2}$) at the position P2 can be reduced.

In FIGS. 5, 6A, and 6B, as the specific example of two sounds which are prominent as the sonic perception, the engagement primary sound at the position P1 and the engagement primary sound at the position P2 are exemplified. Alternatively, the sounds which are prominent in the sonic perception may be sounds generated at positions other than positions P1 and P2 in the vehicle driving apparatus of FIG. 1, or the sound may be a harmonic sound of second or higher order and does not need to be limited to the primary sound (sound of the fundamental wave).

For example, when the noise of sounds generated at positions other than the positions P1 and P2 is to be reduced, a design item corresponding to the sound (for example, design items other than the tooth number $Z_{DN1}$ and the tooth number $Z_{DN2}$) may beset to a design value satisfying one of the conditions 1~3 of Formula 2.

In addition, for example, there may be cases where a torque fluctuation (torque ripple) generated by the rotations of the motors (the first motor 11 and the second motor 12) causes vibration and noise. For example, when a permanent magnet motor is used, a pulsation is generated corresponding to the lowest common multiple of a number of poles of the permanent magnet and a number of salient poles around which a coil is wound. When the vibration and noise due to the pulsation is prominent for the sonic perception, the number of poles of the permanent magnet and the number of salient poles of the coil may be set to suitable design values in consideration of the performance of the motor, to adjust the frequencies, and to thereby realize, for example, a design that satisfies one of the conditions 1~3 of Formula 2.

In addition, in place of or in addition to the design, control may be applied to satisfy the reduction conditions of dissonance (for example, one of the conditions 1~3 of Formula 2).

Figure 7A:
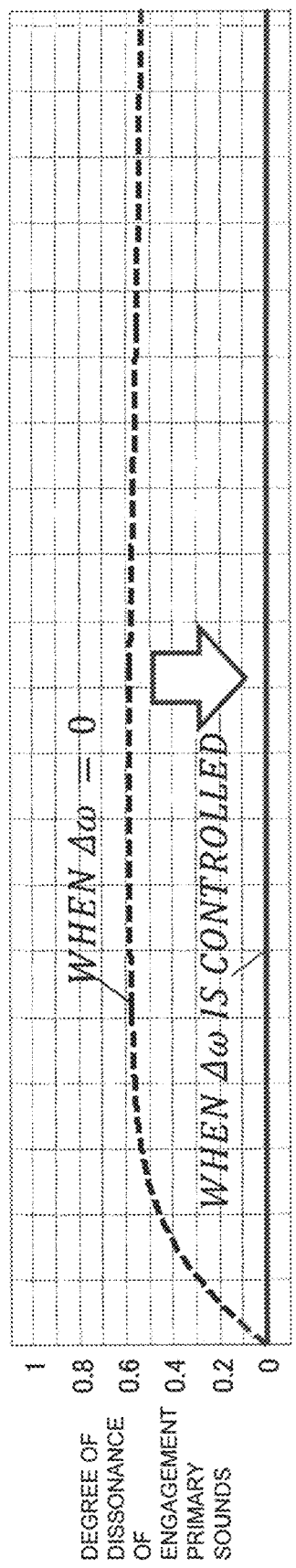
FIG. 7A is a diagram for explaining reduction of a degree of dissonance by control of a difference in a number of rotations.
Figure 7B:
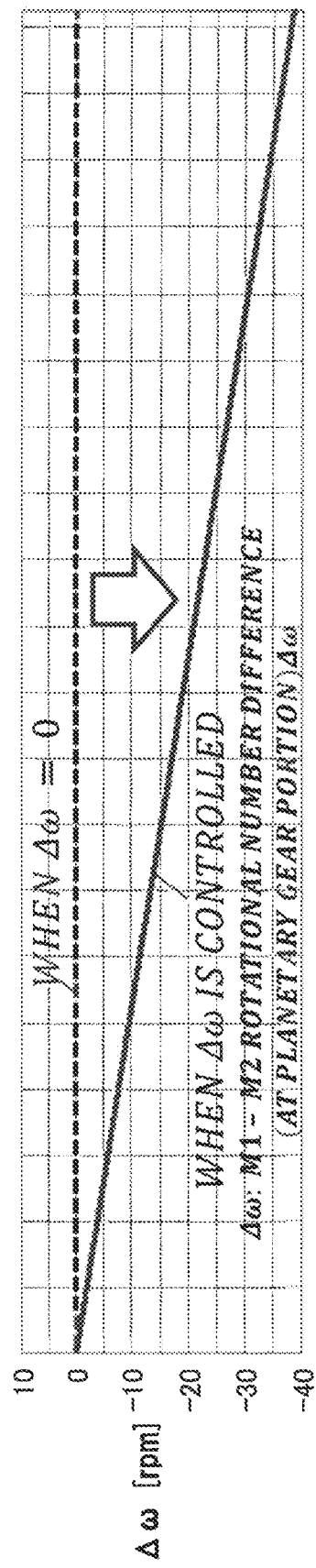
FIG. 7B is a diagram for explaining reduction of a degree of dissonance by control of a difference in a number of rotations.
Figure 7C:
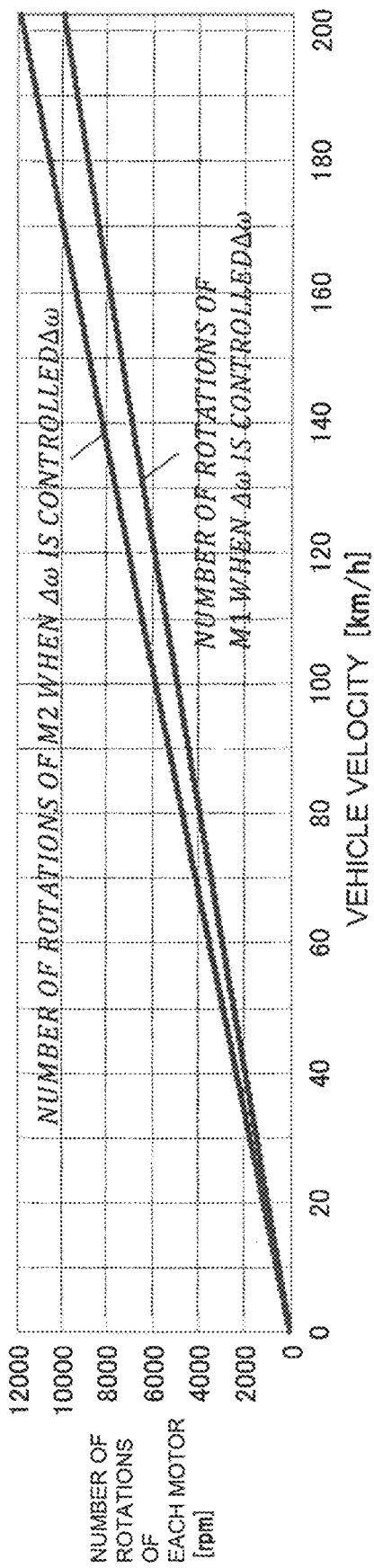
FIG. 7C is a diagram for explaining reduction of a degree of dissonance by control of a difference in a number of rotations.

FIGS. 7A~7C are diagrams for explaining reduction of the degree of dissonance by control of the rotational number difference. FIG. 7A shows a specific example of the degree of dissonance obtained by changing the number of rotations (vehicle velocity of the vehicle in which the vehicle driving apparatus of FIG. 1 is equipped) of the first motor 11. A waveform (broken line) of the rotational number difference $\Delta\omega=0$ shown in FIG. 7A is the waveform (1) obtained by the reference design value shown in FIG. 6B.

When the rotational number difference $\Delta\omega$ is controlled and changed as shown in FIG. 7B, for example, in a slate where the reference design value is maintained; that is, where the design value is not changed, the degree of dissonance can be reduced in a higher level than in the case of the rotational number difference $\Delta\omega>0$, as shown by a solid line (straight line) exemplified in FIG. 7A.

In order to control the rotational number difference $\Delta\omega$ in a manner as shown in FIG. 7B, for example, the numbers of rotations of the first motor 11 (M1) and the second motor 12 (M2) may be controlled in a manner as shown in FIG. 7C.

As described above with reference to FIGS. 7A~7C, the degree of dissonance may be reduced by, for example, controlling the rotational number difference $\Delta\omega$. Because of this, for example, the number of rotations of the motor (at least one of the first motor 11 and the second motor 12) may be controlled in such a manner to satisfy the reduction condition of the dissonance (for example, one of the conditions 1~3 of Formula 2), to reduce the noise (for example, the degree of dissonance of two sounds prominent for the sonic perception).

The invention claimed is:

1. A vehicle driving apparatus which obtains a driving force by combining a motive force of a first motor and a motive force of a second motor by a planetary mechanism, the vehicle driving apparatus comprising:

at least one of a design value and a control quantity in which a frequency ratio between a sound generated by a rotation of the first motor and a sound generated by a rotation of the second motor satisfies a reduction condition of dissonance, wherein:

as the reduction condition of the dissonance, a condition is set in which a frequency ratio $f_{M1}/f_{M2}$ between a frequency $f_{M1}$ of the sound generated by the rotation of the first motor and a frequency $f_{M2}$ of the sound generated by the rotation of the second motor satisfies one of:

$f_{M1}/f_{M2}<0.87$;  (condition 1)

$0.9943<f_{M1}/f_{M2}<1.0057$; and  (condition 2)

$1.14<f_{M1}/f_{M2}$.  (condition 3)

2. The vehicle driving apparatus according to claim 1, wherein a design item included in at least one of the first motor, the second motor, and the planetary mechanism is set to a design value which satisfies the reduction condition of the dissonance.

3. The vehicle driving apparatus according to claim 2, wherein at least one gear included in the planetary mechanism has a number of teeth which satisfies the reduction condition of the dissonance.

4. The vehicle driving apparatus according to claim 1, wherein at least one of the first motor and the second motor is controlled to a number of rotations which satisfies the reduction condition of the dissonance.

5. The vehicle driving apparatus according to claim 4, wherein at least one of the first motor and the second motor is controlled such that a difference in the number of rotations between the first motor and the second motor satisfies the reduction condition of the dissonance.

6. The vehicle driving apparatus according to claim 2, wherein at least one of the first motor and the second motor is controlled to a number of rotations which satisfies the reduction condition of the dissonance.

7. The vehicle driving apparatus according to claim 6, wherein at least one of the first motor and the second motor is controlled such that a difference in the number of rotations between the first motor and the second motor satisfies the reduction condition of the dissonance.

8. The vehicle driving apparatus according to claim 3, wherein at least one of the first motor and the second motor is controlled to a number of rotations which satisfies the reduction condition of the dissonance.

9. The vehicle driving apparatus according to claim 8, wherein at least one of the first motor and the second motor is controlled such that a difference in the number of rotations between the first motor and the second motor satisfies the reduction condition of the dissonance.

* * * * *